June 21, 1932. C. T. HATCH 1,863,982
POULTRY COOP OR CRATE
Original Filed Sept. 13, 1928   2 Sheets-Sheet 1
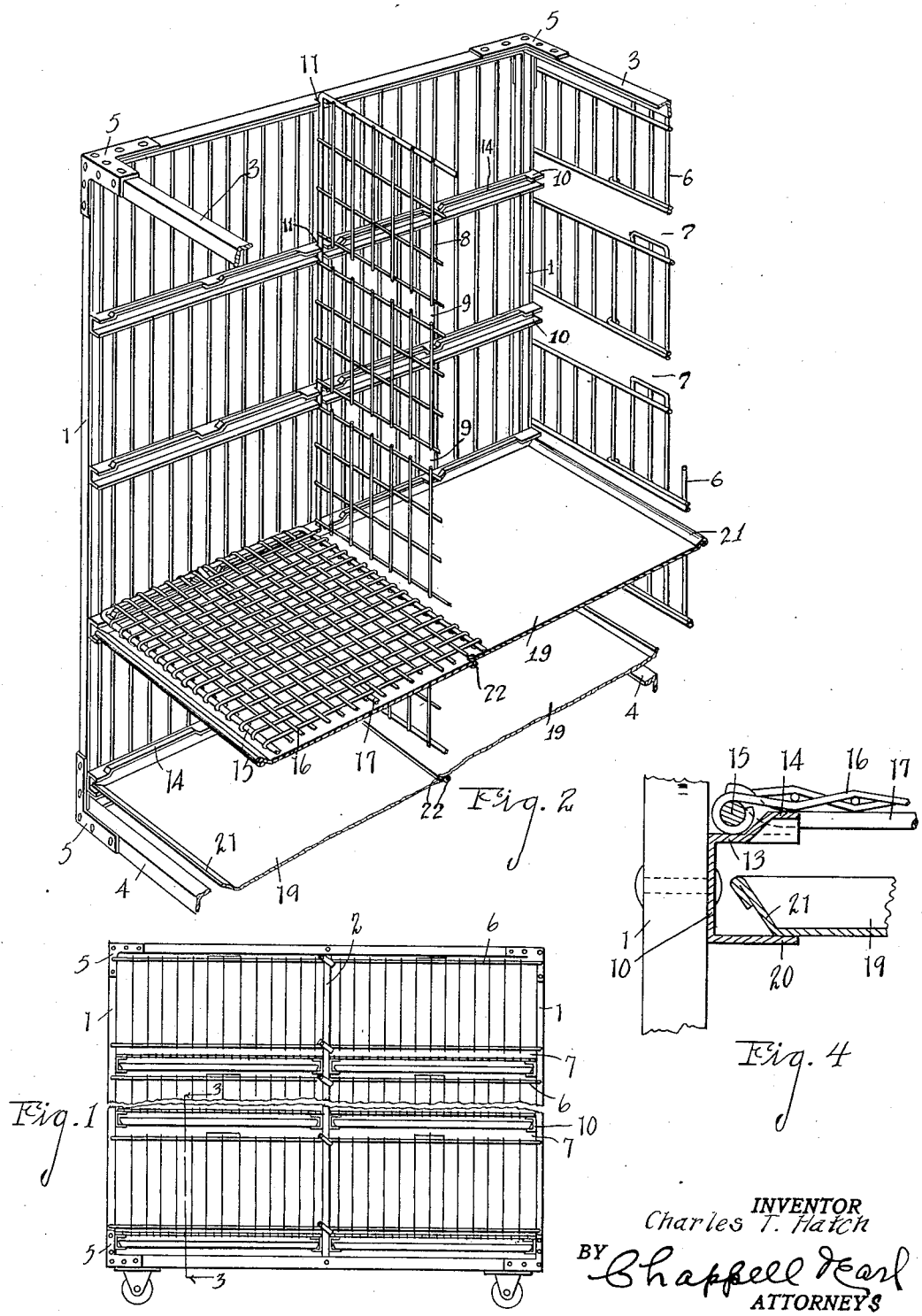
INVENTOR
Charles T. Hatch
BY Chappell Earl
ATTORNEYS June 21, 1932. C. T. HATCH 1,863,982
POULTRY COOP OR CRATE
Original Filed Sept. 13, 1928 2 Sheets-Sheet 2

INVENTOR
Charles T. Hatch
BY Chappell Earl
ATTORNEYS

Patented June 21, 1932

1,863,982

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

POULTRY COOP OR CRATE

Application filed September 13, 1928, Serial No. 305,656. Renewed May 7, 1932.

The main object of this invention is to provide a poultry coop or crate of the feeding battery type in which there are a series of compartments one above another, which is easily kept in a sanitary condition, the floors and pans being readily removed and cleaned and the floors being arranged so that the droppings and litter do not reach the floor of the room.

Objects pertaining to details and economies of my invention will definitely appear from the description to follow. The invention is defined in the claims.

A structure which embodies the features of my invention is clearly illustrated in the accompanying drawings in which:

Fig. 1 is a fragmentary side elevation of my improved poultry coop or crate.

Fig. 2 is a fragmentary perspective view, parts being omitted for convenience in illustration.

Fig. 4 is an enlarged detail section on line 4—4 of Fig. 3.

Figure 3:
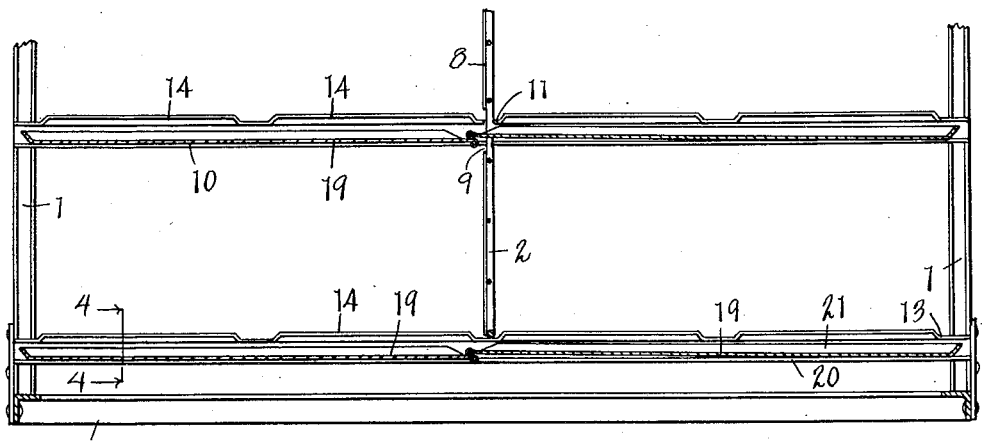
Fig. 3 is a fragmentary section from front to rear on line 3—3 of Fig. 1 with parts omitted.
Figure 5:
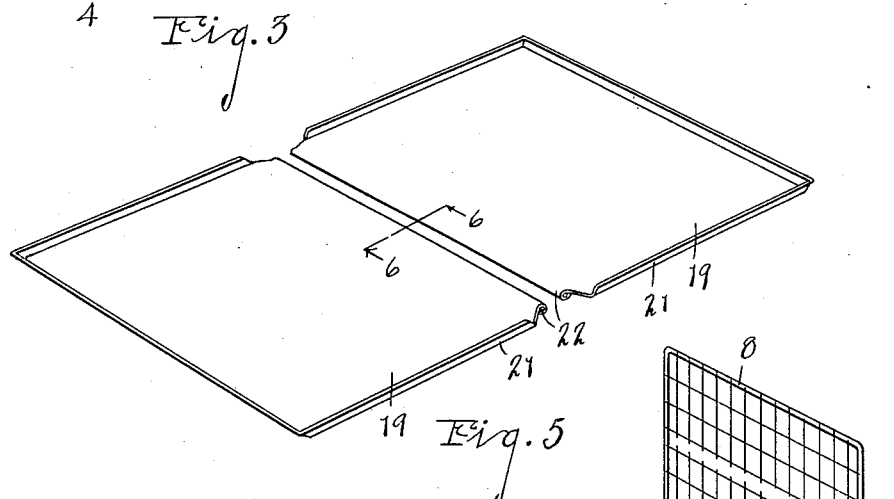
Fig. 5 is a perspective view of a coacting pair of pans in spaced relation.

In the embodiment illustrated I provide a frame comprising corner uprights 1, intermediate uprights 2 and top and bottom side members 3 and 4. The corner uprights and the side members are connected by corner irons 5.

The structure illustrated has two sections each having a double series of compartments. The side walls designated generally by the numeral 6 are arranged to provide openings 7 while the partition designated generally by the numeral 8 has horizontal openings 9 alined with the openings 8.

I provide bottom and tray supporting ledges 10 preferably of channel cross section as illustrated, these being arranged in opposed pairs in alinement with or in the plane of the openings in the side walls and partition and facing inwardly. The ledges and top end members of the frame are provided with alined notches 11 which receive the edges of the partition thereby supporting it.

The upper arms 13 of the ledges have spaced portions 14 thereof struck upwardly thereby providing a plurality of retaining lugs or members for the compartment floors. These compartment floors consist of border frames 15 to which the woven wire grids 16 are secured. Supporting rods 17 having upwardly offset ends 18 secured to the border frame are provided. This supports the center of the woven wire floor grids. The supporting rods 17 are positioned to lie between an adjacent pair of retaining lugs 14.

The floors rest on the upper arms of the ledges with their rims engaged with the lugs thereof so that the floors are effectively retained and cannot be readily dislocated and do not shift about when the crate is moved.

Figure 6:
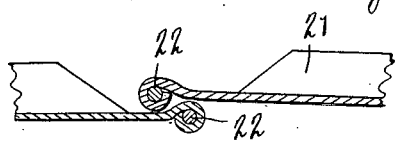
Fig. 6 is a detail section on line corresponding to line 6—6 of Fig. 5 showing the parts in their assembled relation in the crate.
Figure 7:
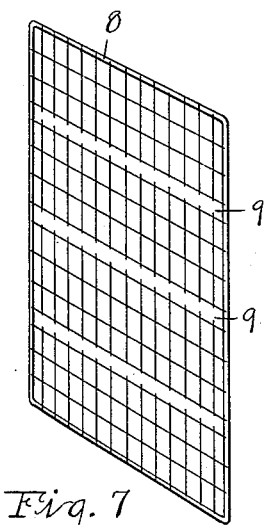
Fig. 7 is a perspective view of one of the partition members.

The pans 19 are supported on the bottom arms 20 of the ledges and are provided with upturned rims 21 on their front and end edges, their rear edges being provided with upwardly offset beads 22. When the pans are assembled with the rack these beads lie in overlapping relation as shown in Figs. 3 and 6 so that there is no opening permitting litter to fall through to the floor.

A further advantage is that the cleaning of the pan is greatly facilitated on account of the absence of the rim on the rear edge, both when cleaned by hand and by machinery.

My improved poultry coops or crates can be easily kept in sanitary condition and the overlapping engagement of the pans prevents their accidental displacement. The floors are very securely retained in position, thus minimizing injury to the fowls.

I have illustrated and described my improvements in the form in which I have embodied the same commercially. I have not attempted to illustrate and describe other modifications and adaptations as I believe this disclosure will enable those skilled in the art to embody or adapt my improvements as may be desired.

Having thus described my invention what I claim as new and desire to secure by Letters Patent is:

1. In a structure of the class described, the combination with the frame comprising uprights, ledges mounted on said uprights in opposed pairs, a partition and side walls disposed at right angles to said ledges and provided with openings alined with said ledges, and pans mounted on said ledges and provided with upturned rims at the front and side edges thereof and with upwardly offset beads at their inner edges disposed in overlapping relation, said beads coacting with each other to hold the pans together.

2. In a structure of the class described, the combination with a frame comprising uprights and a side wall having horizontal openings therein, of shelf ledges alined with said openings and having elongated upwardly projecting floor retaining lugs thereon, and foraminate floors provided with border frames arranged on said ledges in embracing engagement with said lugs whereby the floors are positively retained in position against inward and outward movement.

3. In a structure of the class described, the combination with a frame comprising uprights and a side wall having horizontal openings therein, of shelf ledges alined with said openings and having elongated upwardly projecting floor retaining lugs thereon, and foraminate floors arranged on said ledges in embracing engagement with said lugs whereby the floors are positively retained in position against inward and outward movement.

4. In a structure of the class described, the combination with a frame comprising uprights, side walls and a partition, the partition and side wall parallel therewith having alined horizontal openings therein, of ledges of channel section mounted on said uprights in inwardly facing opposed pairs transversely of the walls having said openings therein and in alinement with said openings, the upper arms of said ledges having portions thereof struck upwardly providing floor retaining members, said retaining members being spaced from each other and from the ends of the ledges, floors comprising border frames and woven wire grids secured thereto, supporting rods for said grids secured to opposed portions of said border frames, said floors being arranged on the upper arms of said shelf ledges with their border frames engaged over the said retaining members, and pans removably mounted on the bottom arms of said shelf ledges, said pans being provided with upturned rims at their outer and side edges and with upwardly offset beads at their inner edges and being disposed with their beaded edges in overlapping engagement within the openings in said partition.

5. In a structure of the class described, the combination with a frame comprising uprights, side walls and a partition, the partition and side wall parallel therewith having alined horizontal openings therein, of ledges of channel section mounted on said uprights in inwardly facing opposed pairs transversely of the walls having said openings therein and in alinement with said openings, the upper arms of said ledges having portions thereof struck upwardly providing floor retaining members, said retaining members being spaced from each other and from the ends of the ledges, floors comprising border frames and woven wire grids secured thereto, said floors being arranged on the upper arms of said shelf ledges, and pans removably mounted on the bottom arms of said shelf ledges, said pans being provided with upturned rims at their outer and side edges and with upwardly offset beads at their inner edges and being disposed with their beaded edges in overlapping engagement within the openings in said partition.

6. In a structure of the class described, the combination with a frame comprising uprights, side walls and a partition, the partition and side wall parallel therewith having alined horizontal openings therein, of ledges of channel section mounted on said uprights in inwardly facing opposed pairs transversely of the walls having said openings therein and in alinement with said openings, floors comprising border frames and woven wire grids secured thereto, supporting rods for said grids secured to opposed portions of said border frames, said floors being arranged on the upper arms of said shelf ledges, and pans removably mounted on the bottom arms of said shelf ledges, said pans being provided with upturned rims at their outer and side edges and with upwardly offset beads at their inner edges and being disposed with their beaded edges in overlapping engagement within the openings in said partition, said beads coacting with each other to hold the pans together.

7. In a structure of the class described, the combination with a frame comprising uprights, side walls and a partition, the partition and side wall parallel therewith having alined horizontal openings therein, of ledges of channel section mounted on said uprights in inwardly facing opposed pairs transversely of the walls having said openings therein and in alinement with said openings, floors comprising border frames and woven wire grids secured thereto, said floors being arranged on the upper arms of said shelf ledges, and pans removably mounted on the bottom arms of said shelf ledges, said pans being provided with upturned rims at their outer and side edges and with upwardly offset beads at their inner edges and being disposed with their beaded edges in overlapping engagement within the openings in said partition, said beads coacting with each other to hold the pans together.

In witness whereof I have hereunto set my hand.

CHARLES T. HATCH.